United States Patent
Yao et al.

(10) Patent No.: US 7,606,959 B2
(45) Date of Patent: Oct. 20, 2009

(54) MULTIPROCESSOR SYSTEM USING STACKED PROCESSOR MODULES AND BOARD TO BOARD CONNECTORS

(75) Inventors: Li Yao, Nanshan (CN); Wei Chen, Nanshan (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 0 days.

(21) Appl. No.: 11/606,307

(22) Filed: Nov. 27, 2006

(65) Prior Publication Data

US 2007/0239963 A1 Oct. 11, 2007

(30) Foreign Application Priority Data

Mar. 29, 2006 (CN) .................. 2006 1 0034808

(51) Int. Cl.
*G06F 13/00* (2006.01)
(52) U.S. Cl. .................. 710/301; 710/104; 361/790
(58) Field of Classification Search .................. 710/104, 710/301; 361/790
See application file for complete search history.

(56) References Cited

U.S. PATENT DOCUMENTS

| | | | | |
|---|---|---|---|---|
| 4,773,868 | A * | 9/1988 | Heinecke | 439/69 |
| 6,547,569 | B1 * | 4/2003 | Issaa | 439/65 |
| 6,799,234 | B1 * | 9/2004 | Moon et al. | 710/110 |
| 2001/0031568 | A1 * | 10/2001 | Brekosky et al. | 439/74 |
| 2006/0041707 | A1 | 2/2006 | Chou | |
| 2007/0112983 | A1 * | 5/2007 | Yamada et al. | 710/104 |
| 2007/0266184 | A1 * | 11/2007 | Yamada et al. | 710/5 |
| 2008/0077718 | A1 * | 3/2008 | Kn et al. | 710/104 |
| 2008/0101049 | A1 * | 5/2008 | Casto et al. | 361/788 |

FOREIGN PATENT DOCUMENTS

| | | |
|---|---|---|
| CN | 1105977 | 7/1996 |
| CN | 1464415 | 12/2003 |
| JP | 11007348 | 12/1999 |

OTHER PUBLICATIONS

Japanese patent publication 11-007348 machine generated English translation.*
"PCI-104 Specification, Version 1.0"; PC/104 Embedded Consortium; Nov. 2003.*

* cited by examiner

*Primary Examiner*—Glenn A Auve
(74) *Attorney, Agent, or Firm*—Kory D. Christensen; Stoel Rives LLP

(57) ABSTRACT

A multiprocessor system is provided, comprising a baseboard, for arranging peripheral equipments; and a plurality of processor modules, each equipped with a processor and a board-to-board connector; wherein the plurality of processor modules are stacked up, with board-to-board connectors being electrically connected between the processor modules and between the processor modules and the baseboard; the processors communicate with the peripheral equipments in accordance with a specific bus specification; and the operations of the plurality of processor modules are coordinated by routes provided between the processor modules and between the processor modules and the baseboard.

10 Claims, 7 Drawing Sheets

MULTIPROCESSOR SYSTEM USING STACKED PROCESSOR MODULES AND BOARD TO BOARD CONNECTORS

RELATED APPLICATIONS

This application claims priority from Chinese Application No. 200610034808.7, filed on Mar. 29, 2006, which is expressly incorporated by reference in its entirety herein.

TECHNICAL FIELD

The present application relates to a multiprocessor system, and more particularly to an extensible multiprocessor system.

BACKGROUND

In the field of electronics technology, the processing capability of a CPU (Central Processing Unit) is one of the most important factors to affect the performance of an electronic device. With the improvement of CPU manufacturing techniques, multiprocessor technology has seen increasing applications in more and more electronic devices so as to satisfy multitask requirements.

In existing multiprocessor systems, a processor, such as a CPU, and its peripheral basic circuits, are generally designed as a relatively independent CPU module. Through board-to-board connectors, a plurality of such CPU modules are connected to a baseboard respectively, to form a multiprocessor system. On the baseboard, corresponding peripheral equipments can be mounted according to various requirements. Since the baseboard and each of the CPU modules can be upgraded separately, cost may be reduced greatly during upgrade process of the multiprocessor system.

FIG. 1 shows the top view of a conventional multiprocessor system. As shown in FIG. 1, a plurality of CPU modules, namely CPU module 1# and CPU module 2#, are laid onto baseboard 0# via board-to-board connectors 10 and 20 respectively. CPU 1# and CPU 2# which are mounted on the CPU module 1# and CPU module 2#, communicate with peripheral equipments mounted on the baseboard 0# through a Peripheral Component Interconnect (PCI) bus. FIG. 2 is the front view of the conventional multiprocessor system.

However, at the very beginning of designing a multiprocessor system formed in a tiled fashion, it is generally difficult to predict functions potentially to be added in the future. Accordingly, if the reserved CPU modules are far more than actual requirements, it will lead to increase in the cost of the multiprocessor system; and on the other hand, if the reserved CPU modules are not sufficient, the extensibility of the multiprocessor system will be limited by the finite space constraints.

Moreover, in existing multiprocessor systems, the configuration of each CPU module must be varied to process unsymmetrical signals. Here, the configuration of a CPU module comprises the fabrication process of the CPU module, the Printed Circuit Board (PCB) and the components incorporated therein; and the unsymmetrical signals comprise request/reply signals, interrupt signals, clock signals, initialization device select signals and reset signals. Accordingly, this will also increase the costs for manufacturing and maintaining the multiprocessor system.

SUMMARY

One object of an embodiment is to provide a multiprocessor system that can be easily extended according to different requirements.

Another object of an embodiment is to provide a multiprocessor system that employs CPU modules with identical configurations, thereby reducing the costs for manufacturing and maintaining the multiprocessor system.

According to the present embodiments, a multiprocessor system comprises a baseboard, for arranging peripheral equipments; and a plurality of processor modules, each equipped with a processor and a board-to-board connector; wherein the plurality of processor modules are stacked up, with board-to-board connectors being electrically connected between the processor modules and between the processor modules and the baseboard; the processors communicate with the peripheral equipments in accordance with a specific bus specification; and the operations of the plurality of processor modules are coordinated by routes provided between the processor modules and between the processor modules and the baseboard.

According to the present embodiments, there is provided with a method for use in the multiprocessor system, wherein the multiprocessor system comprises a baseboard and a plurality of processor modules, the method comprising: stacking up the plurality of processor modules; connecting the processor modules with each other by using board-to-board connectors and connecting the processor module on the bottom layer with the baseboard by using a board-to-board connector; the processors communicating through a specific bus specification with peripheral equipments arranged on the baseboard; and providing routes between the processor modules and between the processor modules and the baseboard, to coordinate the operations of the plurality of processor modules.

BRIEF DESCRIPTION OF THE DRAWINGS

Detailed descriptions will be made to embodiments with reference to the accompanying drawings in which like reference characters identify correspondingly throughout and wherein.

DETAILED DESCRIPTION OF THE EMBODIMENTS

On the multiprocessor system provided in the present embodiments, a plurality of CPU modules are stacked up. Communications are carried out between each CPU module and the peripheral equipments on the baseboard according to specific bus specifications. The operations of each CPU module are coordinated through the routes provided between the CPU modules and between the CPU modules and the baseboard. Hereinafter, the multiprocessor system provided in the present embodiments will be described in detail with reference to accompanying drawings.

Figure 1:
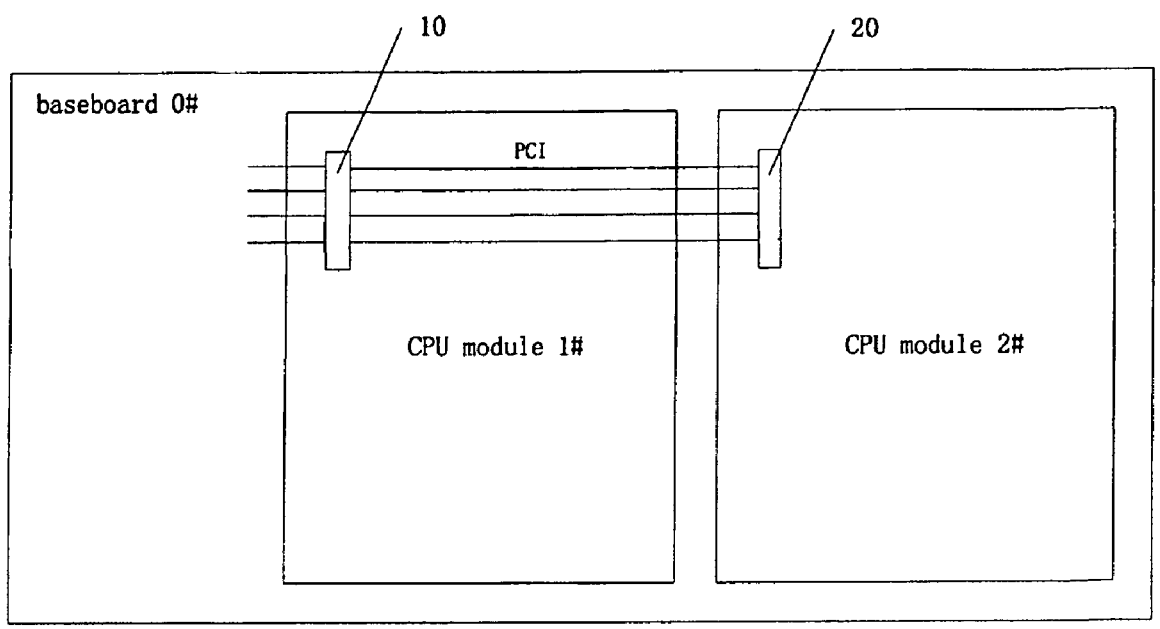
FIG. 1 shows the top view of a conventional multiprocessor system.
Figure 2:
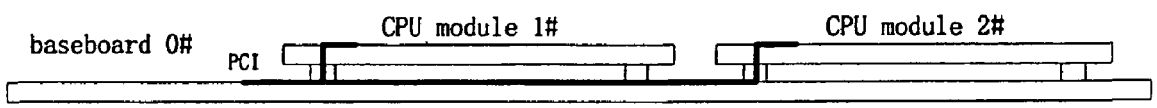
FIG. 2 is the front view of the conventional multiprocessor system.
Figure 3:
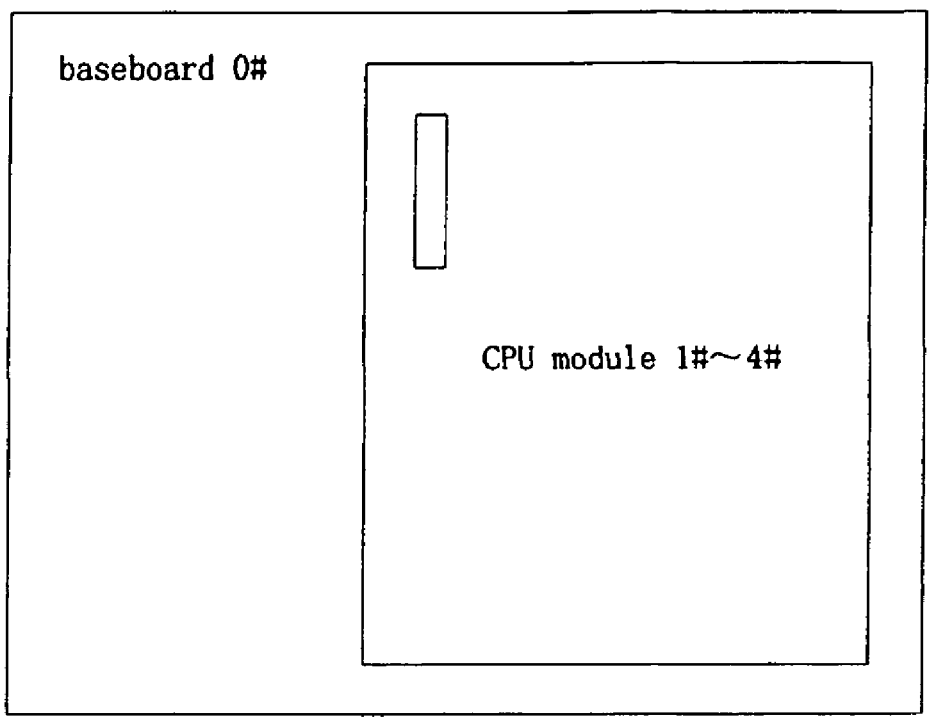
FIG. 3 is the top view of a multiprocessor system according to an embodiment.
Figure 4:
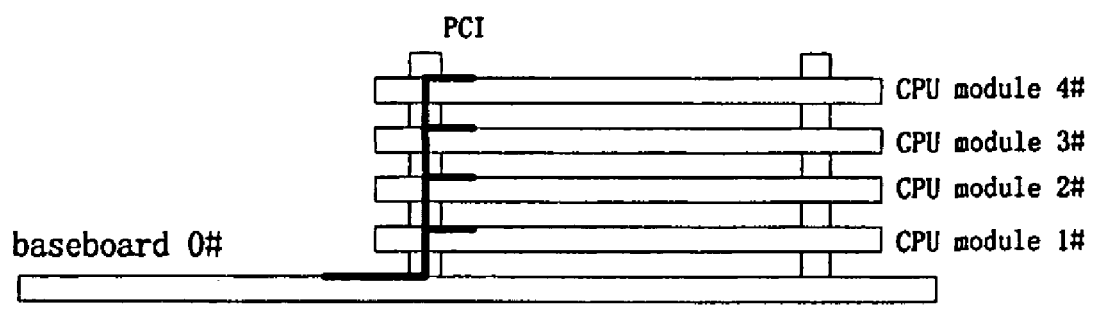
FIG. 4 is the front view of the multiprocessor system shown in FIG. 3.

FIG. 3 is the top view of a multiprocessor system according to an embodiment. FIG. 4 shows the front view of the multiprocessor system. As shown in FIG. 4, a plurality of CPU modules, namely CPU modules 1#, 2#, 3# and 4#, are stacked up. The CPU modules 1#, 2#, 3# and 4# are electrically connected with each other through board-to-board connectors. The CPU module 1# on the bottom layer is connected to the baseboard 0# through a board-to-board connector. Corresponding peripheral equipments may be provided on the baseboard 0# according to different requirements.

In this embodiment, the CPU module may be a module designed with a Microprocessor Unit (MPU), or a module designed with a Digital Signal Processor (DSP). The peripheral equipments may be a network adapter, or a storage device with universal serial bus (USB) interface, for example.

On the multiprocessor system, the CPU modules communicate with the peripheral equipments according to specific bus specifications. In this embodiment, communications are conducted between the CPU modules and the peripheral equipments with a PCI local bus.

In this embodiment, the use of a PCI bus brings two notable advantages. First, according to the PCI bus specification, a communication via the PCI bus should be initiated by a master device. Generally, a module with a processor may act as either a master device or a slave device. Thus, in this embodiment, each CPU module may initiate communication on its own initiative. This facilitates communications between each CPU module and the peripheral equipments in the multiprocessor system. Second, the PCI bus is a symmetrical bus. Symmetrical signals transmitted between the baseboard, each CPU module and each peripheral equipment, for example data signals, address signals and symmetrical control signals, may be directly transmitted on the respective signal lines of the PCI bus interface. This simplifies the hardware circuit design for the multiprocessor system.

Figure 5:
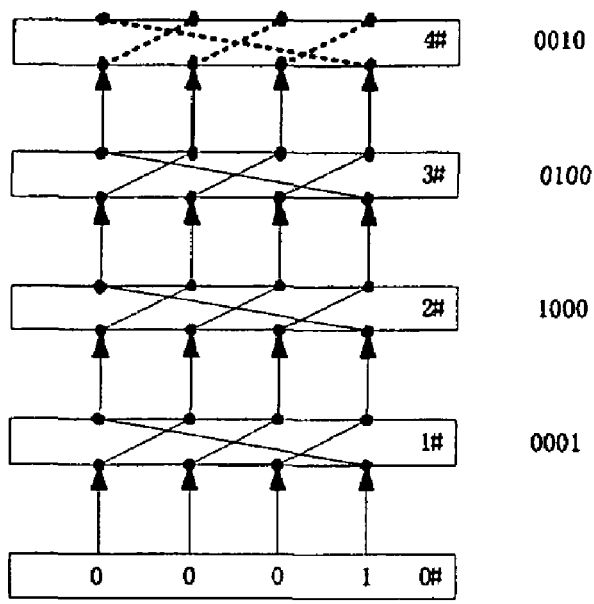
FIG. 5 is a schematic diagram illustrating an identifying module of the multiprocessor system according to an embodiment.

In a preferred embodiment, in addition to employing the PCI bus, the multiprocessor system may be formed with CPU modules having the same configuration, so as to further reduce the costs of the hardware circuit. When the multiprocessor system is formed with CPU modules having the same configuration, an identifying module is to be added to the system to identify each CPU module. FIG. 5 shows a specific implementation of the identifying module.

For each CPU module, the interface part of a board-to-board connector herein may be divided into two parts, i.e. upper board-to-board connector and lower board-to-board connector. For clarity, signals transmitted through the interface of the upper board-to-board connector are predetermined for transmission to the adjacent CPU modules, and signals transmitted through the interface of the lower board-to-board connector are predetermined for use by the CPU module itself. In the accompanying drawings, the solid lines in the board-to-board connector denote the signal lines for transmitting signals and the dashed lines denote the signal lines that are not in use.

As shown in FIG. 5, when the Identifier (ID) provided by the baseboard to the CPU module 1# is 0001, a flag bit 1 is transmitted to the leftmost position on the lower board-to-board connector in the CPU module 2#, through the signal line of the board-to-board connector in the CPU module 1#. In this manner, the ID for the CPU module 2# is 1000. Accordingly, through the signal lines of the board-to-board connectors in the CPU modules 2# and 3#, the CPU modules 3# and 4# are identified as 0100 and 0010, respectively.

Figure 6:
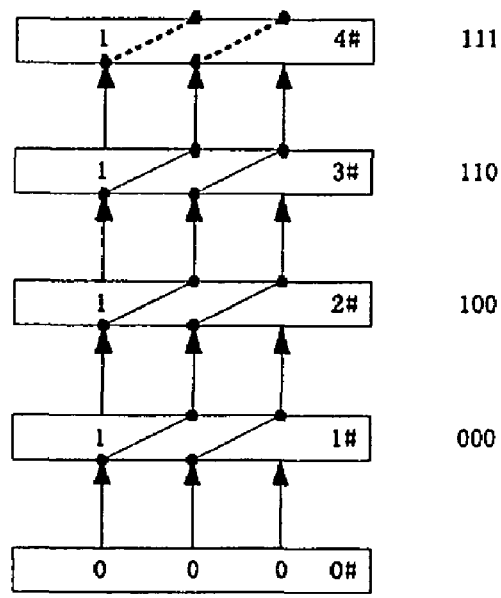
FIG. 6 is a schematic diagram illustrating an identifying module of the multiprocessor system according to another embodiment.

FIG. 6 shows another specific example of the identifying module. In this embodiment, the leftmost position on the upper board-to-board connector in each CPU module is set to 1. In this way, when the ID provided by the baseboard to the CPU module 1# is 000, the CPU modules 2#, 3# and 4# are identified as 100, 110 and 111, respectively, through the signal lines of the board-to-board connector in each of the CPU modules 1#, 2# and 3#.

In case of the multiprocessor system being formed by four CPU modules, the identifying module may also indicate each CPU module with an ID of two bits.

In the preferred embodiment, each CPU module communicates with the peripheral equipments on the baseboard through the PCI bus. The transmission of symmetrical signals, such as the address and data signals, may be obtained through a bus architecture that is formed by directly connecting the CPU on the CPU module to the same pins on the upper board-to-board connector and the lower board-to-board connector respectively. However, for unsymmetrical signals that are transmitted through the PCI bus interface between each CPU module and between the CPU module and the baseboard, such as the request/answer signals, the clock signals, the initialization device select signals, the reset signals and the interrupt signals, the communication needs to be achieved by the following transmission method.

The transmission of unsymmetrical signals in the multiprocessor system will be explained below in more detail with reference to FIG. 7 to FIG. 13.

1. The Transmission of Request/Reply Signals

In the PCI bus specification, when a device having a PCI bus interface is in master device mode, it may request the control bus to initiate communication with another device by sending a request signal REQ.

In the PCI bus specification, an arbiter coordinates the control of each master device over the bus. Generally, on receipt of request signals REQs from different master devices, the arbiter will determine through arbitration which master device has the priority to use the bus. Then, by sending a reply signal GNT, the master device having the priority will be granted control over the bus.

The arbiter may be a part completely independent of the master device, or a part that is integrated inside the master device. A multiprocessor system may exert control over the PCI bus with an external arbiter or a CPU integrated with an arbiter inside.

There is one and can only be one arbiter on the PCI bus. If several arbiters are provided with more than one device on the PCI bus, only one arbiter of a device should be enabled and the arbiters of other devices should be disabled when the system is starting up.

In the preferred embodiment, the CPU module is formed by employing CPUs that are integrated with arbiters inside, and the arbiter in the CPU module 1# is enabled. The arbiter has five pairs of REQ/GNT ports, wherein three pairs of the REQ/GNT ports are used to connect the CPU module 2#, 3# and 4#, respectively, and two pairs of the REQ/GNT ports are used to connect two peripheral equipments on the baseboard, respectively. The request/reply signal of the CPU module 1# itself is integrated inside the CPU chip.

Figure 7:
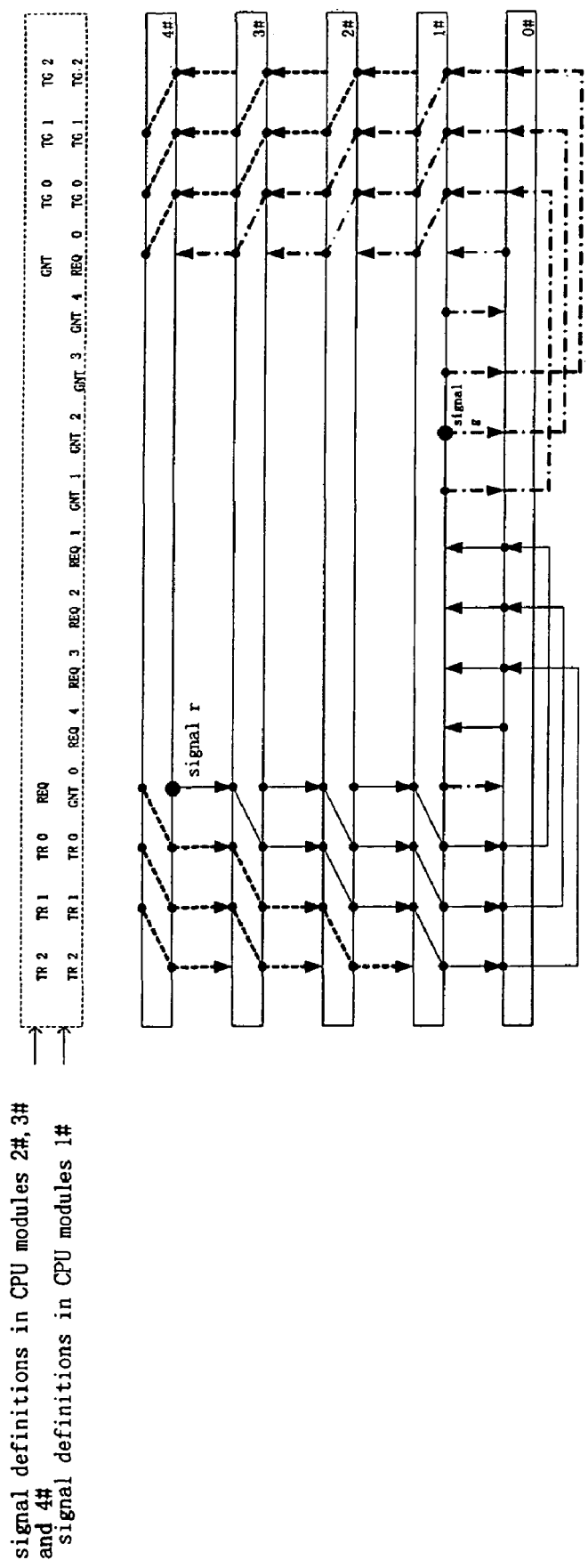
FIG. 7 is a schematic diagram illustrating the transmission of request/reply signals according to an embodiment.

FIG. 7 is a schematic diagram showing the transmission of request/reply signals according to the embodiment. As shown in FIG. 7, two lines of comments included in the dashed lines above the CPU module 4# are used to explain the signal lines on each CPU module. The first line of comments is used to indicate the distribution of the signal lines on the CPU module 2#, 3# and 4#, and the second line of comments is used to indicate the distribution of the signal lines on the CPU module 1#. Similarly as in FIG. 5, for each CPU module, the interface part of a board-to-board connector may be divided into two parts, i.e. upper board-to-board connector and lower board-to-board connector. The signals transmitted through the interface of the upper board-to-board connector are predetermined to transmit to the adjacent CPU modules, and the signals transmitted through the interface of the lower board-to-board connector are predetermined to provide for use by the CPU module itself.

As shown in FIG. 7, the 1st, 2nd and 3rd pairs of REQ/GNT ports of the CPU module 1# are used to receive request signals REQ from the CPU modules 2#, 3# and 4# and to send reply signals GNT to the CPU modules 2#, 3# and 4#, respectively. The $0^{th}$ and $4^{th}$ pairs of the REQ/GNT ports are used to receive request signals REQ from two peripheral equipments on the baseboard and to send reply signals GNT to the peripheral equipments, respectively. In each CPU module, paths TR0, TR1 and TR2 are provided respectively, to route the REQ signals from the CPU modules 2#, 3# and 4# to the CPU module 1#; and paths TG0, TG1 and TG2 are provided respectively, to route the GNT signals generated by the CPU module 1# after arbitration to the CPU modules 2#, 3# and 4#. Here, the solid lines denote the signal lines to transmit REQ signals, the dotted lines denote the signal lines to transmit GNT signals, and the dashed lines denote the signal lines that are not used in the board-to-board connector.

The routing of request/reply signals in the multiprocessor system will be explained below with reference to FIG. 7, by taking a REQ signal r generated by the CPU module 4# and a GNT signal g generated by the CPU module 1# that grants the bus control to the CPU module 3# as an example.

First, the signal r generated by the CPU module 4# is transmitted to the upper board-to-board connector of the CPU module 3# through the lower board-to-board connector of the CPU module 4#. In the CPU module 3#, the signal r is routed to the lower board-to-board connector through the path TR0, and is transmitted to the upper board-to-board connector of the CPU module 2#. In the CPU module 2#, the signal r is routed to the lower board-to-board connector through the path TR1, and is transmitted to the upper board-to-board connector of the CPU module 1#. In the CPU module 1#, the signal r is routed to the lower board-to-board connector through the path TR2, and is transmitted to the REQ port REQ3 on the CPU module 1# that is allocated to and used by the CPU module 4# through the corresponding signal line on the baseboard.

Next, a description will be made as how to transmit the GNT signal g generated by the CPU module 1# to the GNT port of the CPU module 3#. As shown by the dotted lines in FIG. 7, when the arbiter in the CPU module 1# determines to grant the bus control to the CPU module 3#, the CPU module 1# generates a signal g by the GNT port GNT2 allocated to the CPU module 3#. The signal g is transmitted to one end of the path TG1 on the lower board-to-board connector of the CPU module 1#, through the corresponding signal line on the baseboard. In the CPU module 1#, the signal g is routed to the upper board-to-board connector through the path TG1, and is transmitted to one end of the path TG0 on the lower board-to-board connector of the CPU module 2#. In the CPU module 2#, the signal g is routed to the upper board-to-board connector through the path TG0, and is transmitted to the GNT port on the lower board-to-board connector of the CPU module 3#.

The request signals generated by the peripheral equipments on the baseboard will be directly transmitted to the REQ ports REQ0 and REQ4 on the CPU module 1# respectively, through the signal lines between the baseboard 0# and the CPU module 1#. For the CPU module 1#, the GNT signals generated by the GNT ports GNT0 and GNT4 allocated to the peripheral equipment, will be directly transmitted to the baseboard through the signal lines between the baseboard 0# and the CPU module 1#, respectively.

In the embodiments, other unsymmetrical signals, such as clock signals, initialization device select signals and reset signals, are transmitted with a routing method similar to that for the above-mentioned request/reply signals.

Detailed descriptions will be made below with reference to FIG. 8 to FIG. 12. In FIG. 8 to FIG. 12, reference numerals and comments are similar to those in FIG. 7. For example, if the dashed lines above the CPU module 4# comprise two lines of comments, the first line of comments is used to indicate the distribution of the signal lines on the CPU module 2#, 3# and 4#, and the second line of comments is used to indicate the distribution of the signal lines on the CPU module 1#. As another example, for each CPU module, the interface part of a board-to-board connector may be divided into two parts, i.e. upper board-to-board connector and lower board-to-board connector. The signals transmitted through the interface of the upper board-to-board connector are predetermined to transmit to the adjacent CPU modules and the signals transmitted through the interface of the lower board-to-board connector are predetermined for use by the CPU module itself. In the accompanying drawings, the solid lines denote the signal lines for transmitting unsymmetrical signals, and the dashed line denotes the signal lines that are not used in the board-to-board connector.

2. The Transmission of Clock Signals

In the PCI bus specification, all PCI devices should use the same clock, and each PCI device should operate in a point-to-point drive mode.

Figure 8:
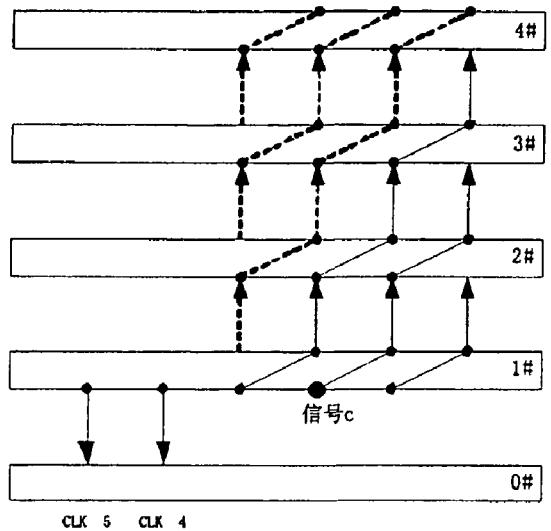
FIG. 8 is a schematic diagram illustrating the transmission of clock signals according to an embodiment.

FIG. 8 is a schematic diagram illustrating the transmission of clock signals according to the preferred embodiment. As shown in FIG. 8, the CPU module 1# generates a clock signal via the clock signal port CLK0 and use the clock signal for its own. The clock signals generated via the clock signal ports CLK1 to CLK3 are used to drive the clock signal port CLKIN on the CPU modules 2#, 3# and 4# respectively. The clock signals generated by the clock signal ports CLK4 and CLK5 are used to drive the peripheral equipments on the baseboard. In each CPU module, paths TC0, TC1 and TC2 are provided to route the clock signals generated by the CPU module 1# to the CPU modules 2#, 3# and 4#, respectively.

The routing of a clock signal to the clock signal port CLKIN of the CPU module 3# will be explained below, by taking a clock signal c generated by the clock signal port CLK2 of the CPU module 1# as an example.

As the solid lines in FIG. 8 show, in the CPU module 1#, the clock signal c generated by the clock signal port CLK2 is first routed to the upper board-to-board connector through the path TC1, and is transmitted to one end of the path TC0 on the lower board-to-board connector of the CPU module 2#. In the CPU module 2#, the signal c is routed to the upper board-to-board connector through the path TG0, and is transmitted to the clock signal port CLKIN on the lower board-to-board connector of the CPU module 3#.

In the CPU module 1#, the clock signals generated by the clock signal ports CLK4 and CLK5 to drive the peripheral equipments will be directly transmitted to the baseboard through the signal lines between the baseboard 0# and the CPU module 1# respectively.

In FIG. 8, the clock signals provided to other CPU modules and the peripheral equipments on the baseboard are generated by one CPU module. If other CPU modules also have the function to generate clock signals, only one clock generator is maintained in the multiprocessor system by not soldering their clock generators, or by disabling their clock outputs.

Figure 9:
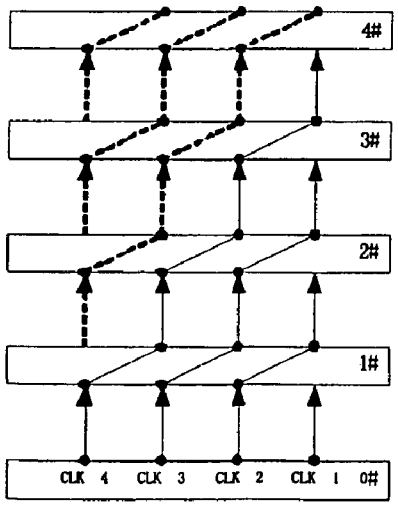
FIG. 9 is a schematic diagram illustrating the transmission of clock signals according to another embodiment.

FIG. 9 is a schematic diagram illustrating the transmission of clock signals according to another embodiment. In FIG. 9, the baseboard generates clock signals to be provided to each CPU module and the peripheral equipments on the baseboard. Referring to FIG. 9, in the baseboard 0#, the clock signal generated by the clock signal port CLK1 is directly transmitted to the clock signal port CLKIN of the CPU module 1#. The clock signals generated by the clock signal ports CLK2 to CLK4 are routed through the paths TC0, TC1 and TC2, to drive the clock signal port CLKIN of the CPU module 2#, 3# and 4# respectively. In this embodiment, the clock signals generated by the clock generator on the baseboard will be directly used to drive the peripheral equipments on the baseboard.

3. The Transmission of Initialization Device Select Signals

Figure 10:
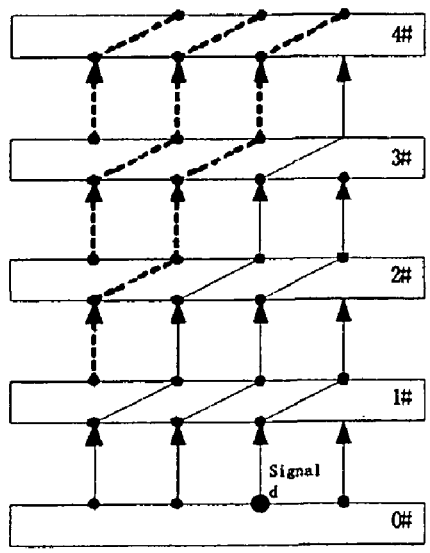
FIG. 10 is a schematic diagram illustrating the transmission of initialization device select signals according to an embodiment.

FIG. 10 is a schematic diagram illustrating the transmission of initialization device select signals according to the preferred embodiment. In FIG. 10, the initialization device select signal IDSEL generated by the baseboard 0# is routed through the paths TI0, TI1 and TI2 of each CPU module, to the initialization device select signal port IDSEL on the CPU module 2#, 3# and 4# respectively.

For example, after the initialization device select signal d generated by the baseboard 0# is transmitted to one end of the path TI0 on the lower board-to-board connector of the CPU module 1#, it is then routed to the upper board-to-board connector through the path TI0, and is transmitted to the initialization device select signal port IDSEL on the lower board-to-board connector of the CPU module 2#.

In the embodiment shown in FIG. 10, the initialization device select signal generated by the baseboard 0# is directly transmitted, through the signal line between the baseboard 0# and the CPU module 1#, to the initialization device select signal port IDSEL on the lower board-to-board connector of the CPU module 1#.

4. The Transmission of Reset Signals

In the multiprocessor system with the PCI bus according an embodiment, there are two reset signals. A system reset signal RESET output from the baseboard or the CPU module when the system is starting up or some abnormal conditions are detected (For example, power drop or crash), is used to reset the whole system so that all modules start synchronously. A reset signal PCIRESET is an active reset signal output from the CPU module after it is reset, and is used to reset each PCI device connected through the PCI bus.

Figure 11:
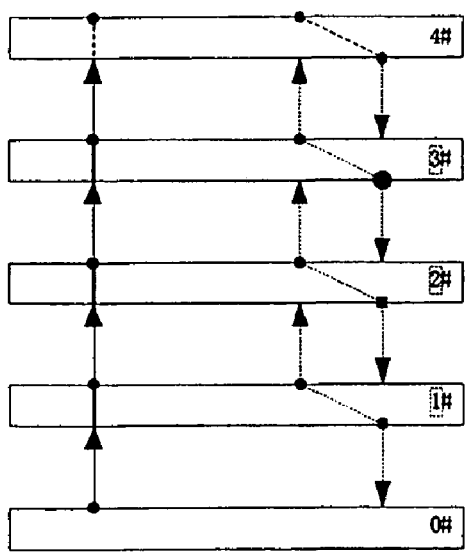
FIG. 11 is a schematic diagram illustrating the transmission of reset signals according to an embodiment.

FIG. 11 is a schematic diagram illustrating the transmission of reset signals according to the embodiment. As shown in FIG. 11, if a system reset signal is generated by the baseboard 0#, then the system reset signal will be directly transmitted, through the signal line between the baseboard 0# and the CPU module 1# and the signal lines between each CPU module, to the reset port RESET of the CPU module 1#, 2#, 3# and 4#. Each CPU module will enter into work mode synchronously upon receipt of the reset signal.

Figure 12:
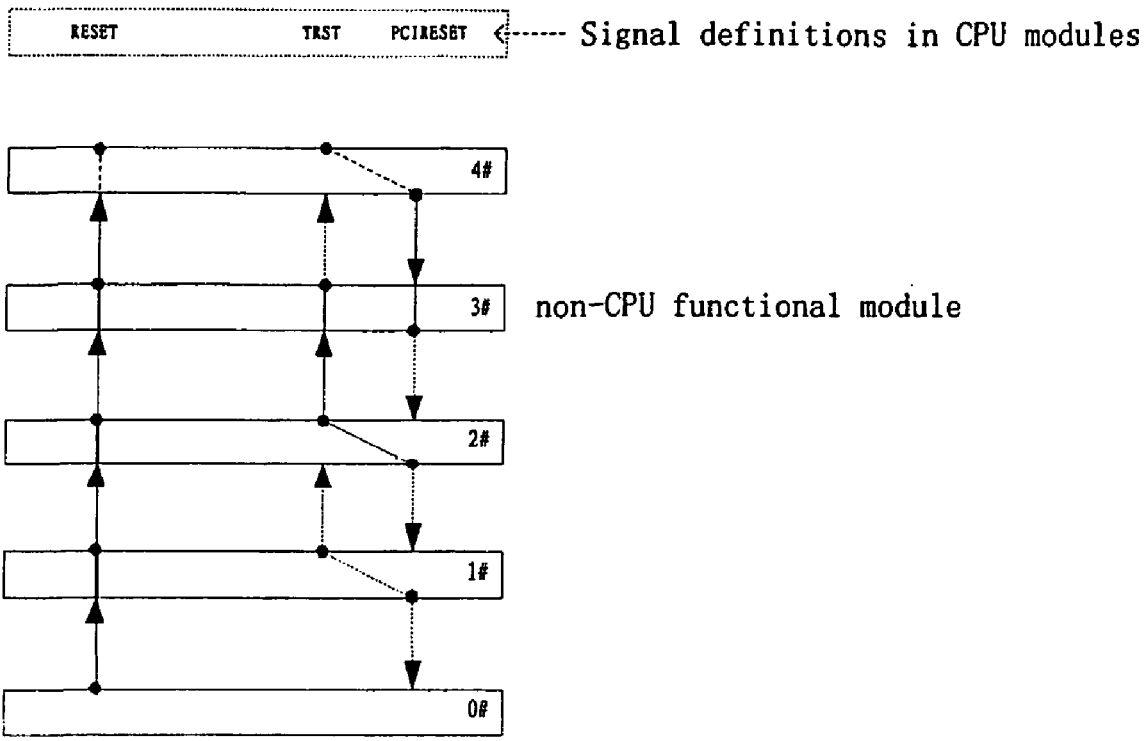
FIG. 12 is a schematic diagram illustrating the transmission of reset signals according to another embodiment.
Figure 13:
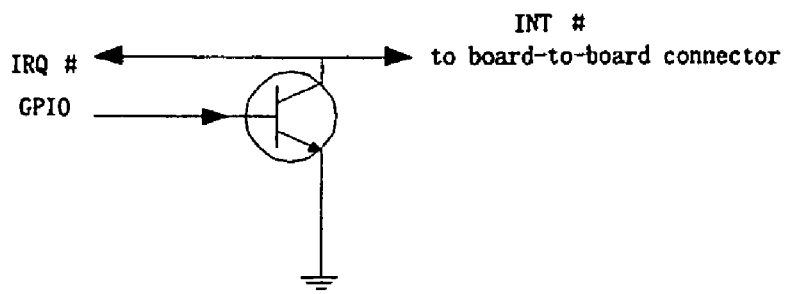
FIG. 13 is a schematic diagram illustrating the transmission of interrupt signals according to an embodiment.

FIG. 11 shows the reset operation in case where each module forming the multiprocessor system is a CPU module. In another embodiment, if one of the modules connected to the baseboard, for example, the module 3#, is a non-CPU module, then the transmission of the reset signal in the multiprocessor system is shown in FIG. 12. In FIG. 12, after the system is reset, the non-CPU module 3# can be reset either by responding to the reset signal PCIRESET from the adjacent CPU module 4#, or by responding to the reset signal PCIRESET routed through the path TRST from the adjacent CPU module 2#. Meanwhile, as shown by the dashed lines between the module 3# and the module 4# in the drawing, the module 3# can also transmit the reset signal PCIRESET output from the CPU module 2# to the module 4#, so that the module 4# can be reset according to the transmitted reset signal PCIRESET even if the module 4# is also a non-CPU module.

Detailed descriptions have been made in connection with specific embodiments to the transmission of unsymmetrical signals by routing between each CPU module and between the CPU module and the baseboard. In the PCI bus specification, the unsymmetrical signals also comprise interrupt signals, in addition to the above-mentioned request/reply signals, clock signals, initialization device select signals and reset signals. Hereinafter, the transmission of the interrupt signal in the multiprocessor system of the present embodiment will be explained with reference to the accompanying drawings.

The PCI bus has an interrupt mechanism. For a non-CPU module, interrupt signals may be output generally whenever the non-CPU module is connected to the interrupt signal line INT# of the PCI bus because it only needs to output interrupt signals. For a CPU module, however, it not only needs to respond to the interrupt signals from the peripheral equipments, but also needs to be able to generate interrupt signals to interrupt other CPU modules. In view of this, for a CPU module that can only receive interrupt signals from the PCI bus and can not interrupt other CPU modules actively, there is a need for a solution so that the CPU module can have the capability to interrupt other CPU modules. A specific example of the solution will be explained below with reference to FIG. 13.

In the embodiment, an interrupt module is provided. Because in the PCI bus specifications, interrupt signals are generated by the open circuit (OC) output of the collector, the interrupt module can thus employ a transistor to implement the OC output of the collector. A pull-up resistance is provided on the baseboard, the pull-up circuit being connected to the collector of the transistor. With regard to the interrupt module shown in FIG. 13, when a CPU module expects to interrupt other CPU modules, the CPU module first disables its interrupt port IRQ# to avoid interrupting itself. Afterward, the CPU module applies a high level to the GPIO (General-Purpose Input Output) port so that the transistor whose base is connected to the GPIO port, can be turned on. When the transistor is turned on, the interrupt signal line INT# of the PCI bus that is connected to the collector of the transistor changes to low level, so that an interrupt signal is issued to other CPU modules through the INT#. Upon receipt of an interrupt signal from the PCI bus, other CPU modules will first query which CPU module issued the interrupt, then determine how to respond to it.

ADVANTAGEOUS EFFECTS

For the above-mentioned multiprocessor system according to the present embodiment, because a plurality of CPU modules are stacked up, each CPU module communicates with peripheral equipments on the baseboard in accordance with specific bus specifications, and the operations of each processor module are coordinated by routes provided between each processor module and between the processor module and the baseboard. Compared with existing multiprocessor systems in which CPU are laid, the multiprocessor system of the present embodiment not only is extensible, but also its extensibility is less limited by the space constraints.

Moreover, in the multiprocessor system of the present embodiment, because an identifying module can identify different CPU modules, each CPU module may have the same configuration. Thus, compared with existing multiprocessor systems, the multiprocessor system of the present embodiment reduces the costs for manufacturing and maintaining effectively.

Furthermore, the multiprocessor system of the present embodiment may be constructed with a plurality of CPU modules and non-CPU modules, and accordingly has wide application prospects. For example, a multiprocessor system formed with a communication module and a plurality of CPU modules can be applied in wired and wireless communication fields. In addition to a communication module, the non-CPU module may be a graphics processing module, a storage module and so on.

While the multiprocessor system has been described with respect to specific embodiments, it will be obvious to those skilled in the art that various substitutions, modifications and changes may be made in the above-described embodiments. Thus all the substitutions, modifications and changes are within the spirit and scope of the invention as defined in the claims.

It should be noted that the above-mentioned embodiments do not limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The embodiments may be implemented by hardware comprising several distinct elements, and/or by a suitably programmed computer. The mere fact that certain features are recited in mutually different dependent claims does not indicate that a combination of these features cannot be implemented using a single device.

The invention claimed is:

1. A multiprocessor system, comprising:
a baseboard, configured to arrange plural processors and one or more peripheral equipments, wherein the processors and the one or more peripheral equipments are configured to communicate according to a specific bus specification comprising a signal-to-processor port assignment;
a plurality of stacked processor modules, each comprising a processor;
a plurality of board-to-board connectors configured to electrically interconnect the plural processors and the baseboard; and
an identifying module configured to identify each of the processor modules,
wherein the processor modules have identical configurations,
wherein the specific bus specification comprises a symmetrical bus,
wherein the board-to-board connectors comprise a signal path configured to route a signal defined by the signal-to-processor port assignment to a port of a selected one of the plural processors, and
wherein the signal path is defined by a position of the selected processor within the stack of processor modules.

2. The system according to claim 1, wherein the processor comprises a Microprocessor Unit (MPU) and/or a Digital Signal Processor (DSP).

3. The system according to claim 1, wherein the symmetrical bus comprises a Peripheral Component Interconnect (PCI) bus.

4. The system according to claim 3, wherein the signal comprises at least one of an address signal, a data signal and a symmetrical control signal.

5. The system according to claim 3, wherein the signal comprises at least one of a request/reply signal, an interrupt signal, a clock signal, a reset signal and an initialization device select signal.

6. The system according to claim 3, further comprising:
an interrupt module comprising a transistor circuit to generate interrupt signals by connecting a base of the transistor circuit to a general-purpose input-output (GPIO) port of a processor module and connecting a collector of the transistor to an interrupt signal line of the PCI bus.

7. The system according to claim 1, further comprising:
a non-central processing unit (CPU) module, wherein one of the plural processors is configured to provide a reset signal to the non-CPU module through a signal path of the board-to-board connectors.

8. The system according to claim 7, wherein the non-CPU module comprises at least one of a graphics processing module, a communication module and a storage module.

9. The system according to claim 1, wherein the identifying module identifies a particular processor module based on a position of the particular processor module in the stack of processor modules.

10. The system according to claim 1, wherein the identifying module identifies a particular processor module based on a signal path interconnecting the identifying module and the particular processor.

* * * * *